(12) United States Patent
Kaneko et al.

(10) Patent No.: US 12,654,630 B2
(45) Date of Patent: Jun. 16, 2026

(54) FUNCTION ADDING DEVICE

(71) Applicant: YAMABIKO CORPORATION, Ohme (JP)

(72) Inventors: Kazuhiro Kaneko, Ohme (JP); Kenji Nakano, Ohme (JP); Daisuke Ishihira, Ohme (JP); Takahiro Ueno, Ohme (JP)

(73) Assignee: YAMABIKO CORPORATION (JP)

( * ) Notice: Subject to any disclaimer, the term of this patent is extended or adjusted under 35 U.S.C. 154(b) by 44 days.

(21) Appl. No.: 18/897,031

(22) Filed: Sep. 26, 2024

(65) Prior Publication Data

US 2025/0115191 A1     Apr. 10, 2025

(30)     Foreign Application Priority Data

Oct. 10, 2023     (JP) ................................. 2023-174884

(51) Int. Cl.
| | |
|---|---|
| B60R 11/02 | (2006.01) |
| B60R 11/00 | (2006.01) |
| G01S 17/06 | (2006.01) |
| G01S 17/931 | (2020.01) |

(52) U.S. Cl.
CPC .......... B60R 11/0264 (2013.01); G01S 17/06 (2013.01); G01S 17/931 (2020.01); B60R 2011/004 (2013.01)

(58) Field of Classification Search
CPC .......... B60R 11/0264; B60R 2011/004; G01S 17/931; G01S 17/06
USPC .......................................................... 701/1
See application file for complete search history.

(56) References Cited

U.S. PATENT DOCUMENTS

| | | | | |
|---|---|---|---|---|
| 2008/0004770 A1* | 1/2008 | Masamura | ........... | B60G 17/018 |
| | | | | 701/37 |
| 2010/0076649 A1* | 3/2010 | Iyoda | ..................... | B60G 17/08 |
| | | | | 701/38 |
| 2019/0200519 A1* | 7/2019 | Chrysanthakopoulos | ................... | |
| | | | | B25J 9/1697 |
| 2020/0384980 A1* | 12/2020 | Yu | ........................ | G05D 1/0088 |
| 2021/0382185 A1* | 12/2021 | Furuta | .................... | B60C 23/02 |

FOREIGN PATENT DOCUMENTS

| | | | | |
|---|---|---|---|---|
| DE | 102014000987 A1 | 7/2014 | | |
| EP | 2223838 A1 * | 9/2010 | ........... | B60W 10/22 |
| EP | 3225437 A1 * | 10/2017 | ........... | F16F 9/3465 |
| JP | 2017-204043 A | 11/2017 | | |
| JP | 2022-179577 A | 12/2022 | | |

OTHER PUBLICATIONS

European Search Report issued in the corresponding European Patent Application No. 24203843.8; dated Feb. 24, 2025 (total 11 pages).

\* cited by examiner

*Primary Examiner* — Tuan C To

(74) *Attorney, Agent, or Firm* — Harness, Dickey & Pierce, P.L.C.

(57)     ABSTRACT

A function adding device is provided. The function adding device comprises a housing that is mounted on a vehicle, a circuit stored in the housing to add a function to the vehicle, and a first vibration-proof member provided between the housing and the vehicle to damp vibrations transmitted from the vehicle to the housing.

7 Claims, 12 Drawing Sheets

FUNCTION ADDING DEVICE

CROSS REFERENCE TO RELATED APPLICATIONS

The present application claims priority under 35 U.S.C. § 119 to Japanese Patent Application No. 2023-174884, filed Oct. 10, 2023, the contents of which are incorporated herein by reference in their entirety.

BACKGROUND

The present invention relates to a function adding device.

RELATED ART

JP 2022-179577 A discloses a control device used to remotely monitor a plurality of autonomous vehicles configured to be switchable between an autonomous travel mode and a remote control mode.

In the case where functions such as an autonomous travel function are retrofitted to a remotely controllable vehicle, it is difficult to provide a circuit for adding functions to be built in the vehicle. Thus, the circuit needs to be externally mounted to the vehicle. In such a case, the circuit needs to be fixed to the vehicle, but on the other hand, the circuit may fail due to vibrations transmitted from the vehicle.

In view of the above circumstances, the present invention aims to provide a function adding device and the like that can suppress a fault of a circuit to be retrofitted to a vehicle.

According to an aspect of the present invention, a function adding device is provided. The function adding device comprises a housing that is mounted on a vehicle, a circuit stored in the housing to add a function to the vehicle, and a first vibration-proof member provided between the housing and the vehicle to damp vibrations transmitted from the vehicle to the housing.

According to such an aspect, it is possible to suppress a fault of a circuit to be retrofitted to a vehicle.

DETAILED DESCRIPTION

Hereinafter, an embodiment of the present invention will be described with reference to the drawings. Various features described in the embodiment below can be combined with each other.

Embodiment

Figure 1:
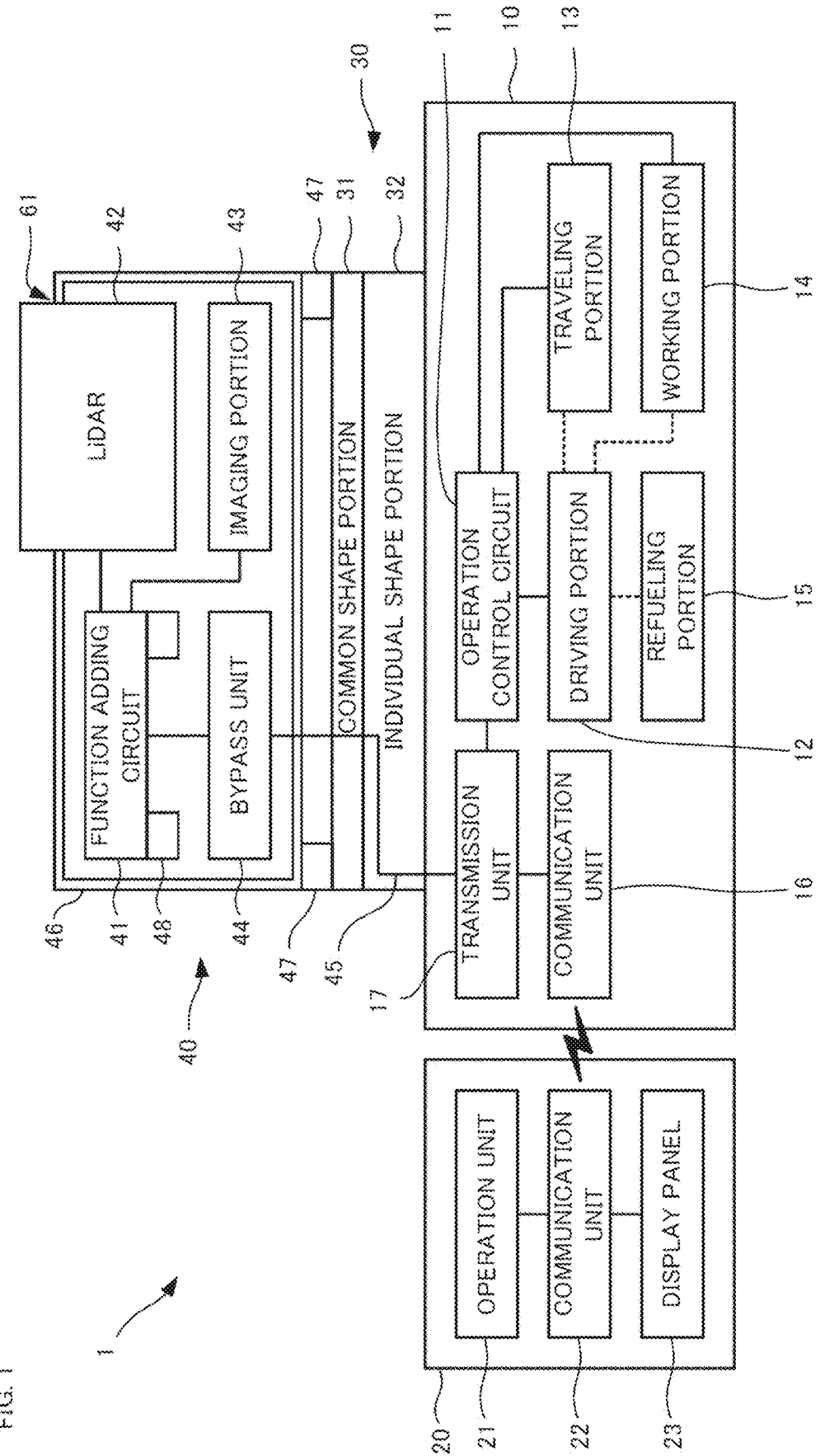
FIG. 1 shows an example of the overall configuration of a vehicle system 1.

FIG. 1 shows an example of the overall configuration of a vehicle system 1. The vehicle system 1 is a system for causing a vehicle to travel and perform a predetermined work. The predetermined work is, for example, a mowing work in a predetermined area such as a field. The vehicle system 1 comprises a vehicle 10, a remote controller 20, a mounting member 30, and a function adding device 40. The vehicle 10 and the remote controller 20 in the vehicle system 1 are existing products and are configured as the vehicle system 1 by mounting the mounting member 30 and the function adding device 40 afterward. Hereinafter, a description will be given of the existing products first.

Figure 2:
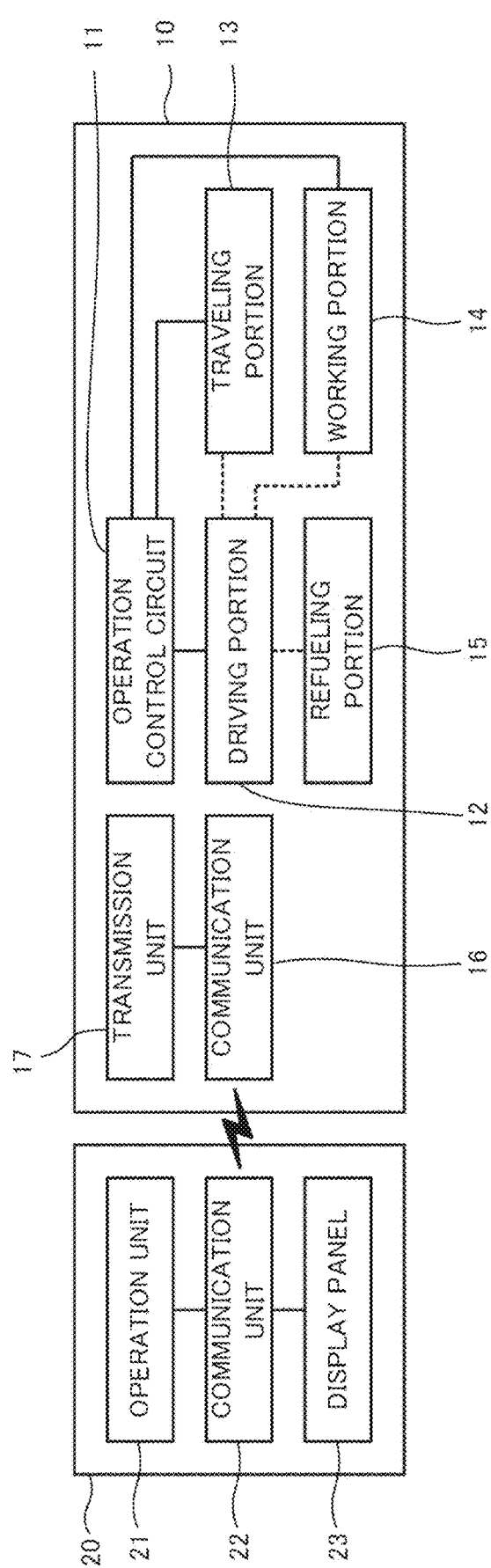
FIG. 2 shows an example of a configuration of a vehicle 10 and a remote controller 20.

FIG. 2 shows an example of a configuration of the vehicle 10 and the remote controller 20. The vehicle 10 has a travel function and a work function, and it performs a predetermined work while traveling. The remote controller 20 is a controller that has a wireless communication function and remotely controls the vehicle 10. The vehicle 10 comprises an operation control circuit 11, a driving portion 12, a traveling portion 13, a working portion 14, a refueling portion 15, a communication unit 16, and a transmission unit 17. The remote controller 20 comprises an operation unit 21, a communication unit 22, and a display panel 23.

The operation control circuit 11 is a circuit that controls operations of each portion of the vehicle 10. The circuit is an electronic component in which an electric component is placed on a printed circuit board. The circuit may include both electronic and electrical circuits. The driving portion 12 is a portion that generates driving force. In the vehicle 10, the driving portion 12 allows an engine that rotates by burning fuel to generate electric power, charges a battery by using the generated electric power, and generates driving force by rotating an electric motor using the charged electric power. The traveling portion 13 is mechanically connected to the driving portion 12 via gears, etc., and is a portion that is supplied with driving power from the driving portion 12 to drive the vehicle 10. The traveling portion 13 is a caterpillar track, such as so-called Caterpillar (registered trademark) in the vehicle 10.

The working portion 14 is mechanically connected to the driving portion 12 via gears, etc., and is a portion that performs a predetermined work by being supplied with driving power from the driving portion 12. The working portion 14 is a cutter that cuts grass by rotating a cutting blade in the vehicle 10. The refueling portion 15 stores fuel and supplies the stored fuel to the driving portion 12. The communication unit 16 has a wireless communication function and performs wireless communication with the remote controller 20. The communication unit 16 receives an operation signal (details will be described below) transmitted from the remote controller 20 and supplies the operation signal to the transmission unit 17.

The transmission unit 17 is a path for transmitting electrical signals and transmits the supplied operation signal to the operation control circuit 11. The operation control circuit 11 controls the operation of each portion (the driving portion 12, the traveling portion 13, and the working portion 14) based on the transmitted operation signal. At the same time, the operation control circuit 11 generates status information indicating an operation status of each portion, converts the generated status information into a signal, and transmits the signal to the remote controller 20 via the transmission unit 17 and the communication unit 16. The status information is information indicating, for example, a traveling speed, a traveling direction, and whether the working portion 14 is in operation or not.

The operation unit 21 has an operating lever, receives an operation of the vehicle 10 by the operator, and generates an operation signal indicating the received operation details. The operation of the vehicle 10 includes traveling forward and backward, turning left and right, turning on/off of the working portion 14, and the like. The communication unit 22 transmits an operation signal generated by the operation unit 21 wirelessly to the vehicle 10. The communication unit 22 receives the status information transmitted from the vehicle 10. The display panel 23 displays the received status information of the vehicle 10 (e.g., traveling, cutter in operation, or the like).

The explanation will be given with referring back to FIG. 1. The function adding device 40 can be mounted on various vehicles, not limited to the vehicle 10, and a mounting member that matches the shape of the vehicle is used. The mounting member 30 is a mounting member adapted to the shape of the vehicle 10. The mounting member 30 comprises a common shape portion 31 and an individual shape portion 32. The common shape portion 31 is a portion to which the function adding device 40 is fixed and has a common shape regardless of the vehicle to which the mounting member 30 is mounted. The individual shape portion 32 is a portion fixed to the vehicle and has a shape adapted to the individual vehicle.

The function adding device 40 is a device that adds functions to the vehicle 10. The function adding device 40 adds an autonomous travel function to the vehicle 10 in the example of FIG. 1. The autonomous travel function is a function that allows the vehicle 10 to travel autonomously without the operator's operation. The function adding device 40 comprises a function adding circuit 41, a LiDAR 42, an imaging portion 43, a bypass unit 44, a cable 45, a housing 46, first vibration-proof members 47, and a second vibration-proof member 48.

The function adding circuit 41 is a circuit that realizes functions to be added to the vehicle 10. The circuit is an electronic component in which an electric component is placed on a printed circuit board as well as the operation control circuit 11, and it may include both electronic and electrical circuits. The function adding circuit 41 enables various functions to be added. The following describes a case in which an autonomous travel function is added to enable the vehicle 10 to travel autonomously without the operation of the remote controller 20.

A LiDAR 42 (Light Detection And Ranging) is a sensor that emits laser light and measures the distance to an object and its shape based on information from the reflected light. The LiDAR 42 is a 2D LiDAR (two-dimensional LiDAR) whose optical axis directions are on the same plane and emits laser light in 360-degree directions including front, back, left, and right. The imaging portion 43 is a digital camera that has a lens and an image sensor, etc. and captures images represented by light reaching the image sensor. The function adding circuit 41 controls the autonomous travel of the vehicle 10 based on the measurement results by the LiDAR 42 and the images captured by the imaging portion 43.

The bypass unit 44 is electrically connected to the transmission unit 17 of the vehicle 10 via a cable 45, and it is a circuit that diverts the signal transmitted by the transmission unit 17 so that the signal passes through the function adding circuit 41. The bypass unit 44 allows not only the operation signal supplied to the operation control circuit 11 but also the signalized status information generated by the operation control circuit 11 to pass through the function adding circuit 41.

The function adding circuit 41 returns the operation signal directly to the transmission unit 17 and supplies the signal to the operation control circuit 11, and the function adding circuit 41 makes it possible to switch between a manual mode in which the vehicle 10 is manually operated and an automatic mode in which the vehicle 10 is automatically controlled by supplying a control signal that controls the operation of the vehicle 10 instead of the operation signal to the operation control circuit 11 via the transmission unit 17.

The function adding circuit 41 converts an image for mode switching into a signal and transmits the signal to the remote controller 20 via the transmission unit 17 and the communication unit 16. The display panel 23 of the remote controller 20 displays an image for mode switching, allowing the operator to switch between the manual mode and the automatic mode. Mode switching is not limited to the operation of the remote controller 20, but it may be performed, for example, by an operation of a physical switch (toggle switch, etc.) provided in the function adding device 40.

The housing 46 is a rectangular box-shaped member formed of a water-impermeable material such as metal or plastic, and it has a ceiling portion, four lateral face portions, and a bottom surface portion. The housing 46 stores the function adding circuit 41, the LiDAR 42, the imaging portion 43, and the bypass unit 44. The housing 46 has an insertion hole 61 on the ceiling portion. The LiDAR 42 is fixed by being inserted into the insertion hole 61 so that a part of the LiDAR 42 is exposed to the external space, and the part exposed to the external space emits laser light.

The housing 46 is fixed to the common shape portion 31 of the mounting member 30 by the first vibration-proof members 47. Each of the first vibration-proof members 47 is a vibration-proof member having the performance of damping vibrations, such as a spring or rubber. Each of the first vibration-proof members 47 damps vibrations in any direction, including a right/left direction, a front/rear direction, and a vertical direction. The function adding circuit 41 is fixed to the housing 46 by the second vibration-proof member 48. The second vibration-proof member 48 is also a vibration-proof member having the performance of damping vibrations, such as a spring or rubber and damps vibrations in any direction, including a right/left direction, a front/rear direction, and a vertical direction.

Figure 3:
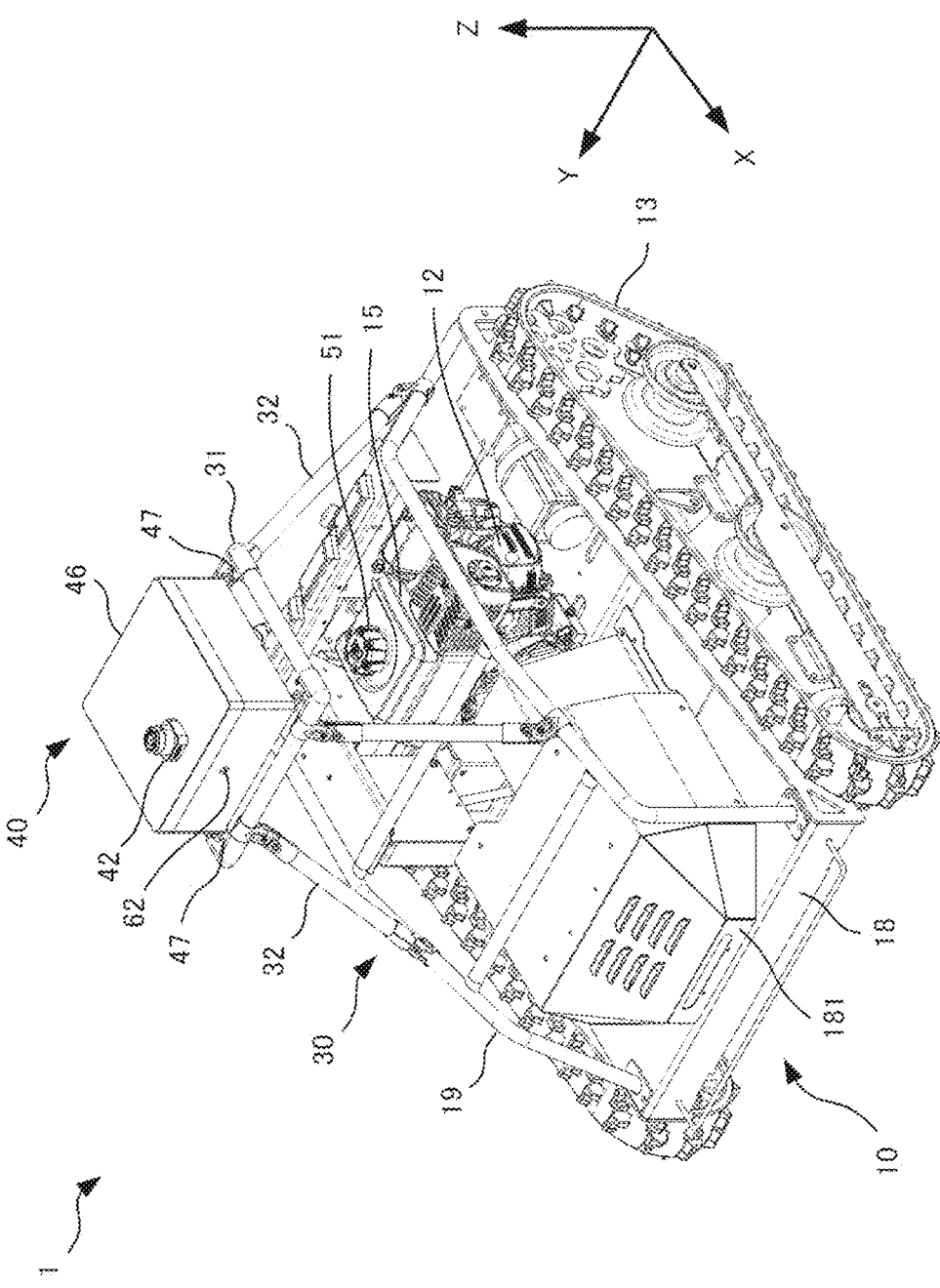
FIG. 3 is a perspective view of the vehicle system 1.
Figure 4:
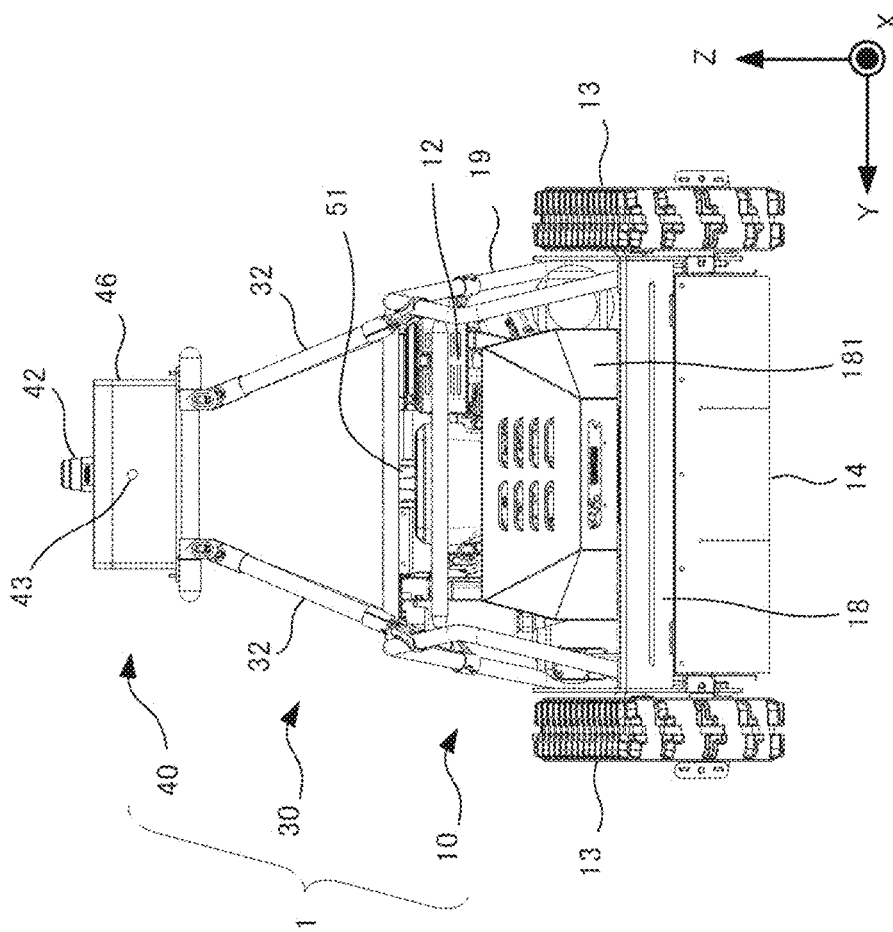
FIG. 4 is a front view of the vehicle system 1.
Figure 5:
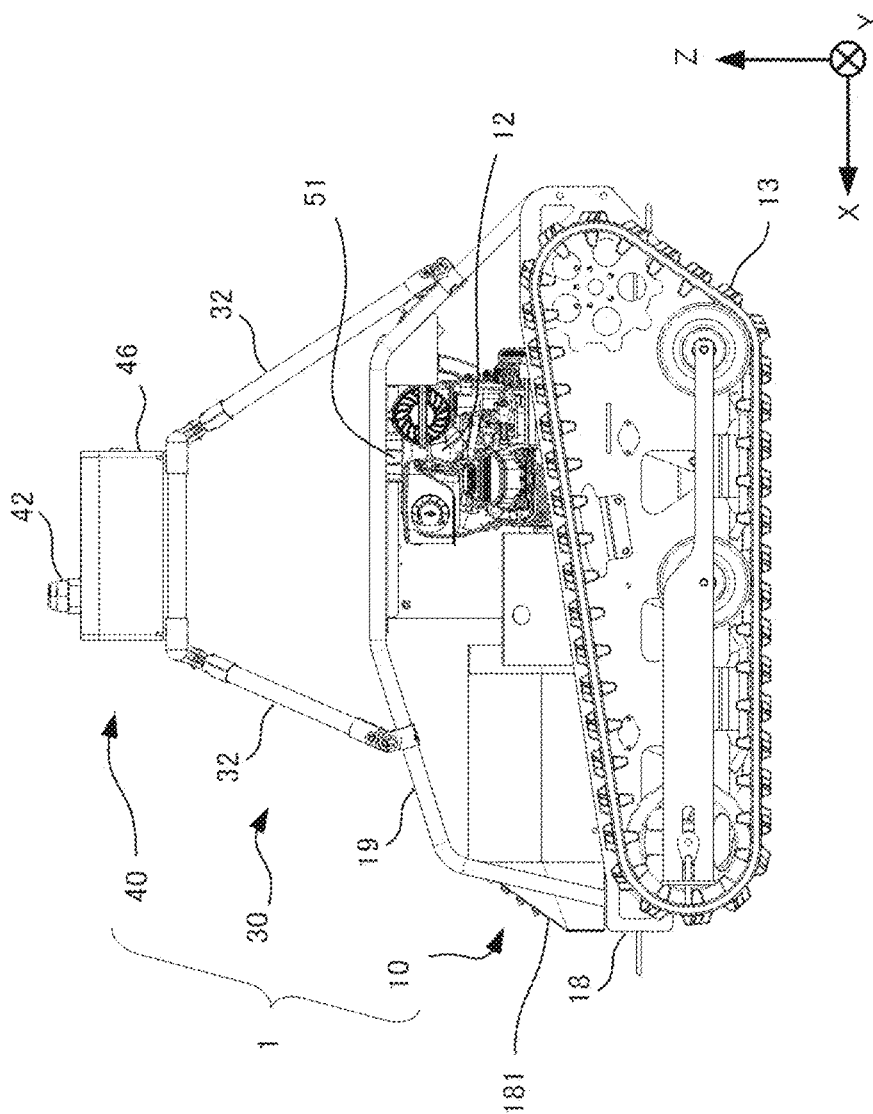
FIG. 5 is a side view of the vehicle system 1.
Figure 6:
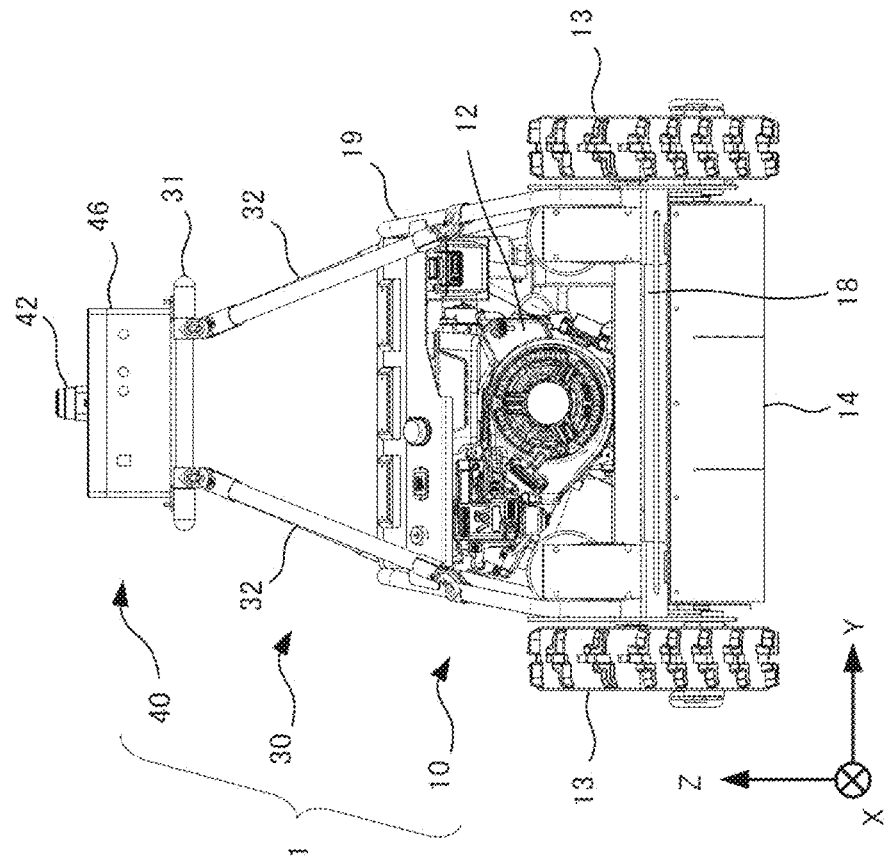
FIG. 6 is a rear view of the vehicle system 1.
Figure 7:
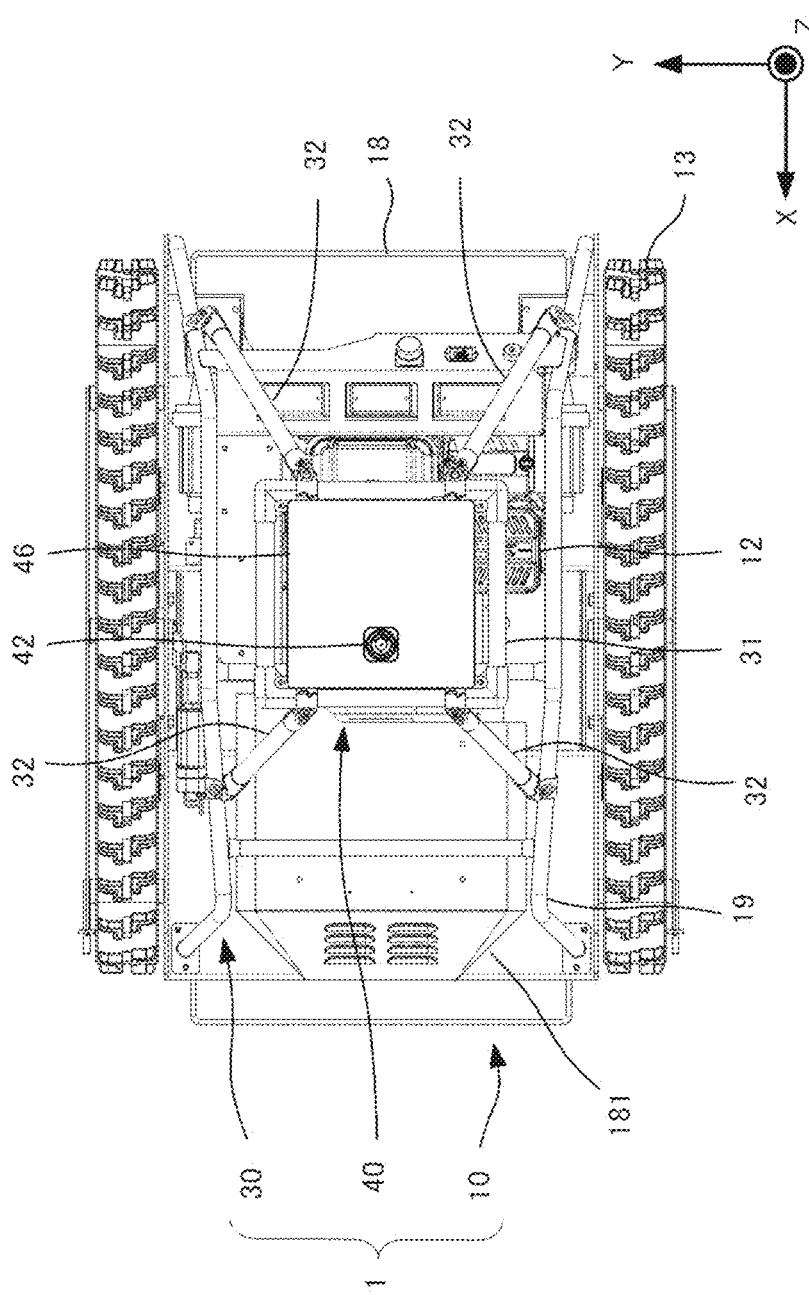
FIG. 7 is a plan view of the vehicle system 1.

Then, the appearance of the vehicle system 1 is described with reference to FIG. 3 through FIG. 7. FIG. 3 is a perspective view of the vehicle system 1. FIG. 4 is a front view of the vehicle system 1. FIG. 5 is a side view of the vehicle system 1. FIG. 6 is a rear view of the vehicle system 1. FIG. 7 is a plan view of the vehicle system 1. In FIG. 3 to FIG. 7, the body of the vehicle 10 is not shown in the figures for the sake of clarity of explanation, and the inside of the vehicle 10 are shown visible.

In FIG. 3 through FIG. 7, the three-dimensional coordinate system is shown by arrows indicating an X-axis, a Y-axis, and a Z-axis, respectively. Hereafter, an X-axis direction, a Y-axis direction, and a Z-axis direction are referred to as the front/rear direction, the right/left direction, and the vertical direction, respectively. The vehicle 10 travels with a direction indicated by an arrow on the X-axis as the front direction. The vehicle 10 has a frame 18 and roll bars 19. The driving portion 12, the traveling portion 13, the working portion 14, and the refueling portion 15 and the like are mounted to the outside of the frame 18. The working portion 14 is mounted below the frame 18 so as to cut the grass that has burrowed under the vehicle 10.

Each of the roll bars 19 is fixed to the outside of the frame 18 by screws or the like. Each of the roll bars 19 is a part formed by joining pipes arranged so as to enclose the driving portion 12, refueling portion 15 and the like. The individual shape portion 32 having four bar-shaped members (pipes) is fixed to each of the roll bars 19. One end of each of the four bar-shaped members is fixed to the roll bar 19, and the other end thereof is fixed to the common shape portion 31.

The function adding device 40 is mounted to the common shape portion 31. A cable 45 shown in FIG. 1, which is arranged from the inside to the outside of the housing 46 of the function adding device 40, is tied to one of the bar-shaped members of the individual shape portion 32. At the top of the frame 18, a storage portion 181 is mounted to store the operation control circuit 11 and the transmission unit 17 shown in FIG. 1. The cable 45 is arranged to the inside of the storage portion 181 and is connected to the transmission unit 17 as shown in FIG. 1.

The function adding device 40 is mounted so as to be positioned vertically above a refueling port 51 of the refueling portion 15. The ceiling portion of the housing 46 is provided with the LiDAR 42. The front side portion of the housing 46 is provided with an imaging hole 62 to allow light to enter the imaging portion 43. The function adding device 40 is provided at a position that is higher than and away from the vehicle 10 by the individual shape portion 32, as shown in FIG. 6. The vibration of the vehicle 10 during traveling is transmitted to the common shape portion 31 by the individual shape portion 32.

Here, the function adding device 40 comprises the housing 46 that is mounted on the vehicle 10, the function adding circuit 41 stored in the housing 46 to add a function to the vehicle 10, and the first vibration-proof members 47 provided between the housing 46 and the vehicle 10 to damp vibrations transmitted from the vehicle 10 to the housing 46. With the first vibration-proof members 47, the vibrations that has transmitted to the common shape portion 31 are greatly damped and transmitted to the housing 46. Thus, only damped vibrations are transmitted to the function adding circuit 41 inside the housing 46. According to such an aspect, it is possible to suppress a fault of a circuit to be retrofitted to a vehicle such as the function adding circuit 41 compared with the case where the first vibration-proof members 47 are not provided.

Furthermore, the function adding device 40 comprises a sensor provided in the housing 46. In the example of FIG. 1, the function adding device 40 comprises three sensors: the LiDAR 42, the imaging portion 43, and an IMU (Inertial Measurement Unit) (not shown). Then, the function adding circuit 41 realizes a function to be added to the vehicle 10 (in the example of FIG. 1, an autonomous travel function) by using the measurement results by those sensors. In the function adding device 40, the vibrations from the vehicle 10 are damped by the first vibration-proof members 47, thus also suppressing the vibrations of the LiDAR 42 and the imaging portion 43 compared with the case where the first vibration-proof members 47 are not provided. This makes it possible to suppress degradation in measurement accuracy due to the vibrations of the sensor.

Figure 8:
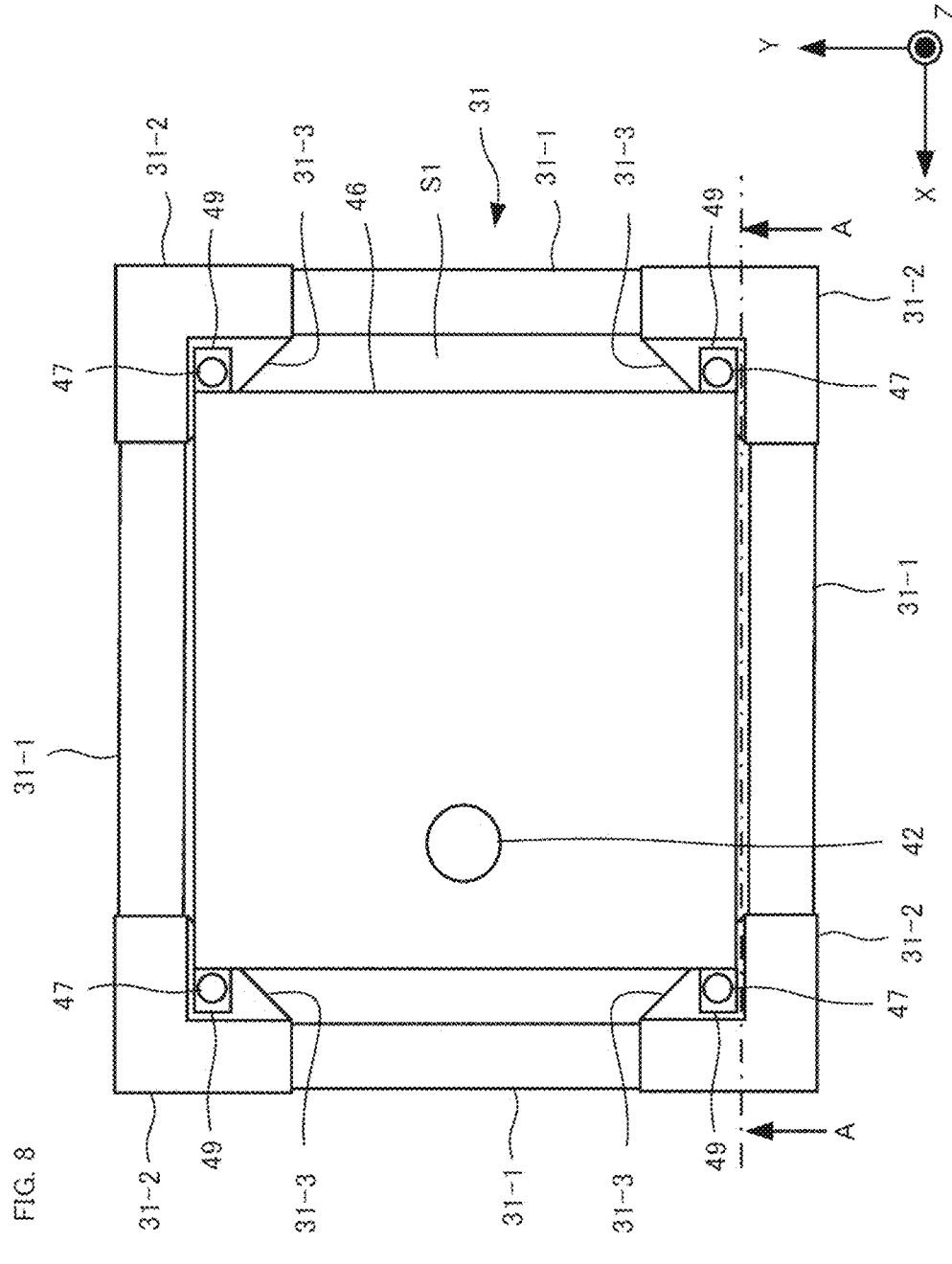
FIG. 8 is an enlarged view of a common shape portion 31 and a function adding device 40 viewed from above.

FIG. 8 is an enlarged view of the common shape portion 31 and the function adding device 40 viewed from above. The common shape portion 31 has four pipe portions 31-1 and four corner portions 31-2. Each of the corner portions 31-2 is a member that fixes the pipe portions 31-1 in a position where each pipe portion 31-1 is inserted so as to be perpendicular to each corner portion 31-2. The pipe portions 31-1 fixed by the corner portions 31-2 and the corner portions 31-2 form a rectangular member (a member having a shape such a picture frame) with a hollow space S1 inside.

A plate portion 31-3 is formed at the S1 side of each of the corner portions 31-2, respectively. Each plate portion 31-3 is a portion for fixing the first vibration-proof member 47. The function adding device 40 has a square shape when viewed from above, and fixing portions 49 are each formed in the front/rear direction near each of four vertices of the function adding device 40. Each of the fixing portions 49 is a portion for fixing the first vibration-proof member 47. A method of fixing the first vibration-proof member 47 is described with reference to FIG. 9.

Figure 9:
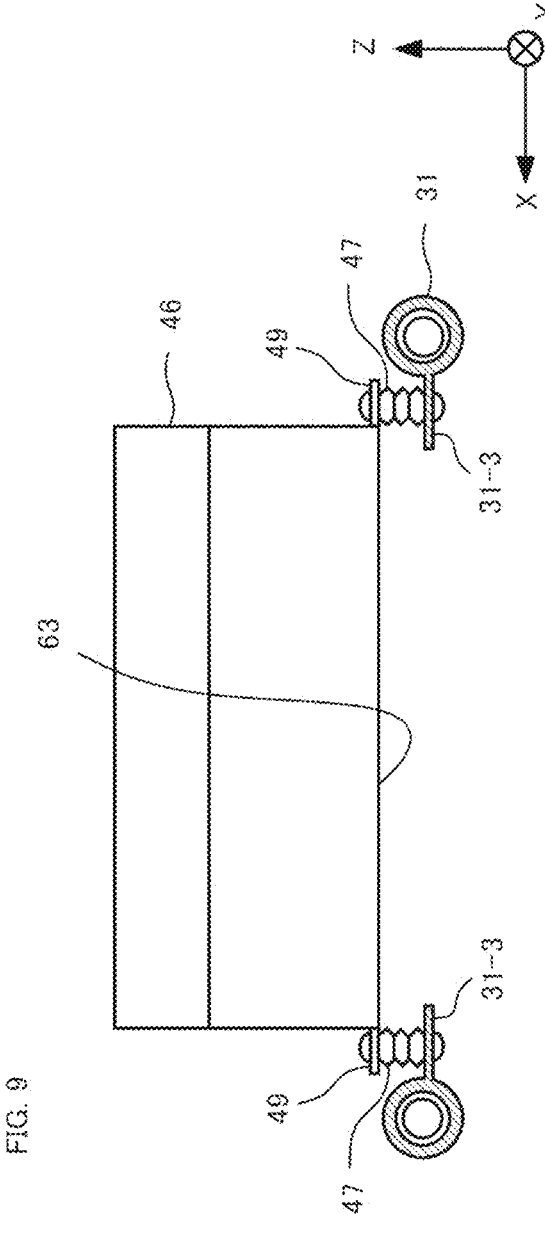
FIG. 9 is a sectional view seen from line A-A of FIG. 8.

FIG. 9 is a sectional view seen from line A-A of FIG. 8. End portions of each first vibration-proof member 47 are screws, and the plate portion 31-3 and the fixing portion 49 each have a hole through which the screws can be inserted. Each first vibration-proof member 47 is fixed to the plate portion 31-3 and the fixing portion 49 respectively by passing the screws of the end portions through the holes and bolting them. The housing 46 has a bottom surface 63 facing vertically downward in a state of being mounted on the vehicle 10. The surface of the fixing portion 49 which faces vertically downward is continuous with the bottom surface 63.

Figure 10:
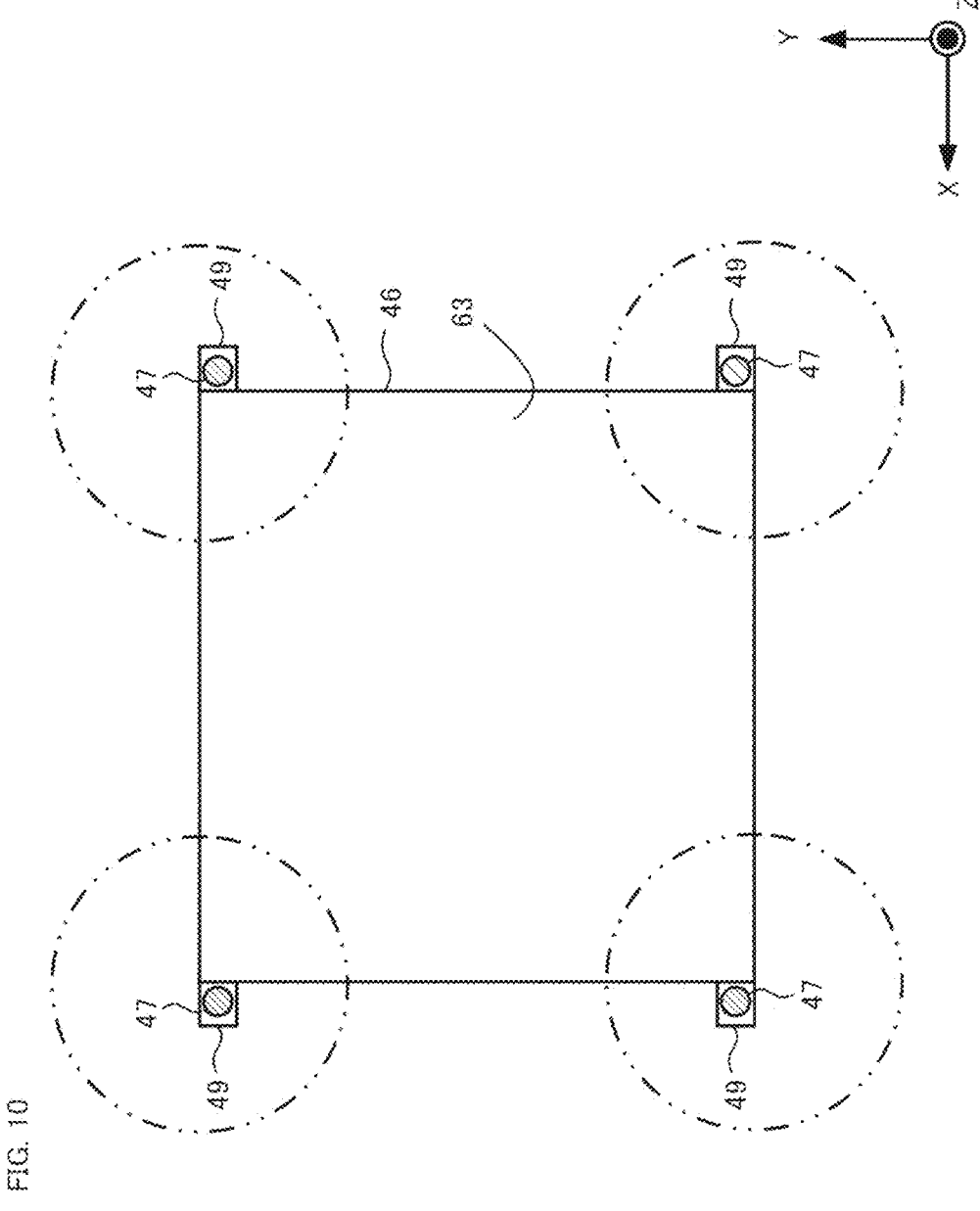
FIG. 10 shows an example of the function adding device 40 viewed vertically from downward.

FIG. 10 shows an example of the function adding device 40 viewed vertically from downward. In the function adding device 40, the bottom surface 63 of the housing 46 is in the shape of a polygon (a square in the example of FIG. 10) when viewed vertically from downward. Each first vibration-proof member 47 is preferably mounted within a predetermined length from the vertex of the polygon. A predetermined length is, for example, one nth (N is a natural number greater than or equal to 2) of the shortest side of the polygon. In FIG. 10, a recommended mounting range when N=4 is shown by double-dashed lines.

According to such an aspect, the housing 46 can be stabilized in comparison with the case where each first vibration-proof member 47 is mounted outside of a predetermined length from the vertex of the polygon. It should be noted that the larger the above-mentioned N, that is, the shorter the predetermined length, the position at which each first vibration-proof member 47 is mounted is closer to the vertex of the polygon, so that the housing 46 becomes easily stable.

It should be noted that the shapes of the housing 46 and the bottom surface 63 are not limited to those shown in FIG. 10. For example, the bottom surface 63 may be in the shape of a polygon other than a quadrilateral and the housing 46 may be in the shape of a hollow prism. In addition, the bottom surface 63 may be in the shape of a quadrilateral with one side deformed so as to form an arc rather than a straight line, and the housing 46 may be in the shape of a hollow prism having the above-mentioned deformed shape as its bottom surface. Even in such a case, each first vibration-proof member 47 is preferably mounted within a predetermined length from the vertex of the deformed quadrilateral shape (both ends of the arc are also vertices). Furthermore, the bottom surface 63 may be circular or oval, and the housing 46 may be in the shape of a hollow column or an oval column. In those cases, each of the first vibration-proof members 47 is preferably provided within a predetermined length from the edge of the circle or oval and spaced apart at regular intervals along the circumference.

As shown in FIG. 1, the function adding circuit 41 is stored in the housing 46. The second vibration-proof member 48 is provided between the function adding circuit 41 and the housing 46 to damp vibrations transmitted from the housing 46 to the function adding circuit 41. In the function adding device 40, the vibrations are damped by providing the first vibration-proof members 47 and providing the second vibration-proof member 48 makes it possible to further damp the vibrations transmitted to the function adding circuit 41 compared with the case where the second vibration-proof member 48 is not provided. As a result, breakage of the function adding circuit 41 can be further suppressed.

As described above, the vehicle to which the function adding device 40 can be mounted includes not only the vehicle 10 but also a plurality of types of vehicles. The first vibration-proof members 47 are fixed to the mounting member 30 that is mounted to each of the plurality of types of vehicles. The shape of the portion of the mounting member 30 that is mounted to the vehicle 10 (i.e., the individual shape portion 32) is a shape corresponding to the vehicle 10. On the other hand, the shape of the portion of the mounting member 30 to which the first vibration-proof members 47 are fixed (i.e., the common shape portion 31) is common regardless of the types of vehicles. According to such an aspect, a common housing can be used for any type of vehicle, and this enables the manufacturing cost of the function adding device 40 to be reduced compared with the case where the shape of the housing is different for each type of vehicle.

Furthermore, the function adding device 40 comprises the LiDAR 42 that is an example of a first sensor provided in the housing 46. The LiDAR 42 has a function of detecting a position of a predetermined marker. The marker mentioned here is a mark indicating the boundary of the area in which the vehicle 10 travels, and it is arranged in the vicinity of the boundary. The marker, such as a plate or a stick having a specific shape, is preferably arranged at a position higher than the height of the weeds to be mowed by the vehicle 10.

The vicinity of the boundary means a location within a predetermined distance from the boundary. The predetermined distance is a distance for preventing the vehicle 10 from coming into contact with a marker 70 when the vehicle 10 travels around the edge or corner of the work area A1, and it is set to, for example, about several tens of centimeters to several meters. Thus, the marker 70 is arranged as a guide for the boundary of the work area A1.

Figure 11:
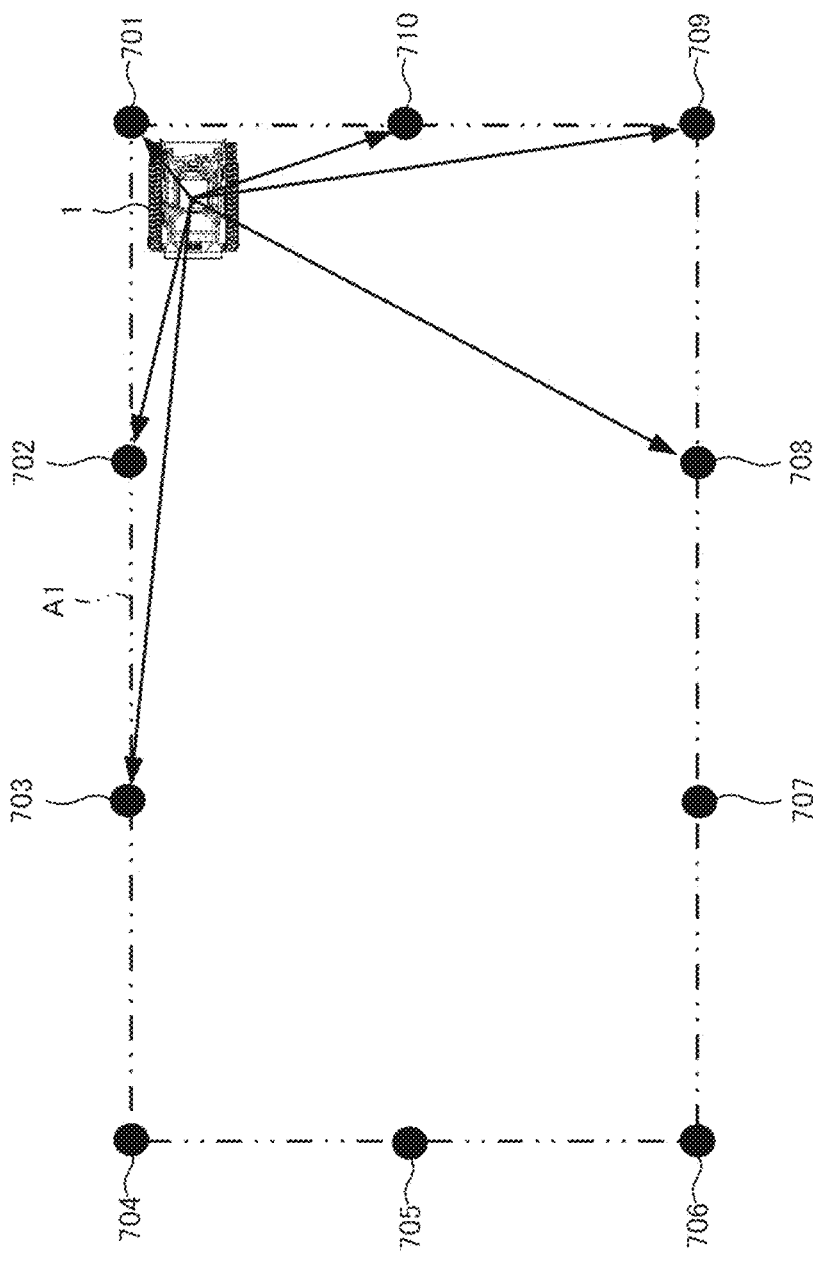
FIG. 11 shows an example of an area where markers are arranged.

FIG. 11 shows an example of an area where markers are arranged. The example in FIG. 11 shows a rectangular work area A1 in which ten markers 70 from markers 701 to 710 (when these markers are not distinguished, referred to as markers 70) are arranged. In the example of FIG. 11, the markers 70 are provided on the boundary of the work area A1 for the sake of clarity of explanation.

The function adding circuit 41 measures the distance and direction to each marker 70 by the LiDAR 42. In the example of FIG. 11, it is assumed that the markers 701, 702, 703, 708, 709 and 710 which are within the detection range of the LiDAR 42 are detected and the markers 704, 705, 706 and 707 which are outside the detection range are not detected.

The function adding circuit 41 may control the vehicle 10 to rotate when detecting the markers 70. For example, depending on how the LiDAR 42 is mounted, the limit distance at which the markers 70 can be detected may vary depending on the orientation. For example, in the case where detection is possible up to the farthest distance in the front direction and the limit distance is set as the maximum detectable distance, the markers 70 can be detected up to the maximum detectable distance in any direction by rotating the vehicle 10.

The function adding circuit 41 controls the vehicle 10 so that the vehicle 10 travels inside an area whose boundary is in the vicinity of the position of the marker detected by the LiDAR 42. The function adding circuit 41 first specifies the area enclosed by the detected markers 701, 702, 703, 708, 709 and 710, and the vehicle 10 travels within the specified area. When the vehicle 10 travels close to the marker 703, which is an end of the specified area, the function adding circuit 41 stops the vehicle 10 once and detects the markers 70 again using the LiDAR 42.

In this case, the markers 704, 705, 706 and 707 also fall within the detection range, and thus the distance and direction are measured by the LiDAR 42. In this manner, the function adding circuit 41 detects all the markers 70 by repeating the process of detecting the markers 70 again after when the vehicle travels to the end of the area whose boundary is the position of the detected marker, and it specifies the work area A1 with all the detected markers 70 as boundaries. According to such an aspect, the vehicle can travel within a predetermined area (e.g., work area A1) even without a position sensor. In the function adding device 40, the first vibration-proof members 47 also damp the vibrations of the LiDAR 42, and this enables the accuracy of the detection result of the LiDAR 42 to be improved and this enables the accuracy of the autonomous travel to be improved compared with the case where the first vibration-proof members 47 are not provided.

It should be noted that the number of markers 70 is not limited to 10 shown in FIG. 11. For example, four markers 70 may be arranged at the four corners of the work area A1. In such a case, it is desirable that all of the four markers 70 can be detected from anywhere in the work area A1. In the case where some of the markers 70 cannot be detected because the work area A1 is too large, for example, a string-like object (a rope or a belt, etc.) may be attached between the markers 70 to indicate the boundary line of the work area. In such a case, the LiDAR 42 detects the string-like object in addition to the markers 70.

The function adding device 40 comprises the imaging portion 43 (in detail, an image sensor included in the imaging portion 43), which is an example of a second sensor provided in the housing 46. The imaging portion 43 (image sensor) is a sensor that detects images represented by visible lights. When the function adding circuit 41 performs pattern recognition processing or the like on the image captured by the imaging portion 43, it is possible to detect specific objects, such as a person or a car, which are to be obstacles for the vehicle 10. Thus, the imaging portion 43 cooperates with the function adding circuit 41 to perform a function of detecting obstacles.

When the imaging portion 43 detects an obstacle, the function adding circuit 41 controls the vehicle 10 to avoid a collision with the obstacle. For example, when an obstacle is detected, the function adding circuit 41 stops the vehicle 10 to avoid a collision with the obstacle. Furthermore, when an obstacle is detected, the function adding circuit 41 changes the direction to the one where the obstacle does not exist to avoid a collision with the obstacle. According to such an aspect, the vehicle 10 can avoid colliding with an obstacle. In the function adding device 40, since the first vibration-proof members 47 also damp vibrations of the imaging portion 43, this enables the accuracy of the detection results (captured images) of the imaging portion 43 to be improved, and this also enables the accuracy of processing for avoiding a collision to be improved compared with the case where the first vibration-proof members 47 are not provided.

<Configuration Variations>

The method of providing the first vibration-proof members is not limited to that shown in FIG. 8 or the like.

Figure 12A:
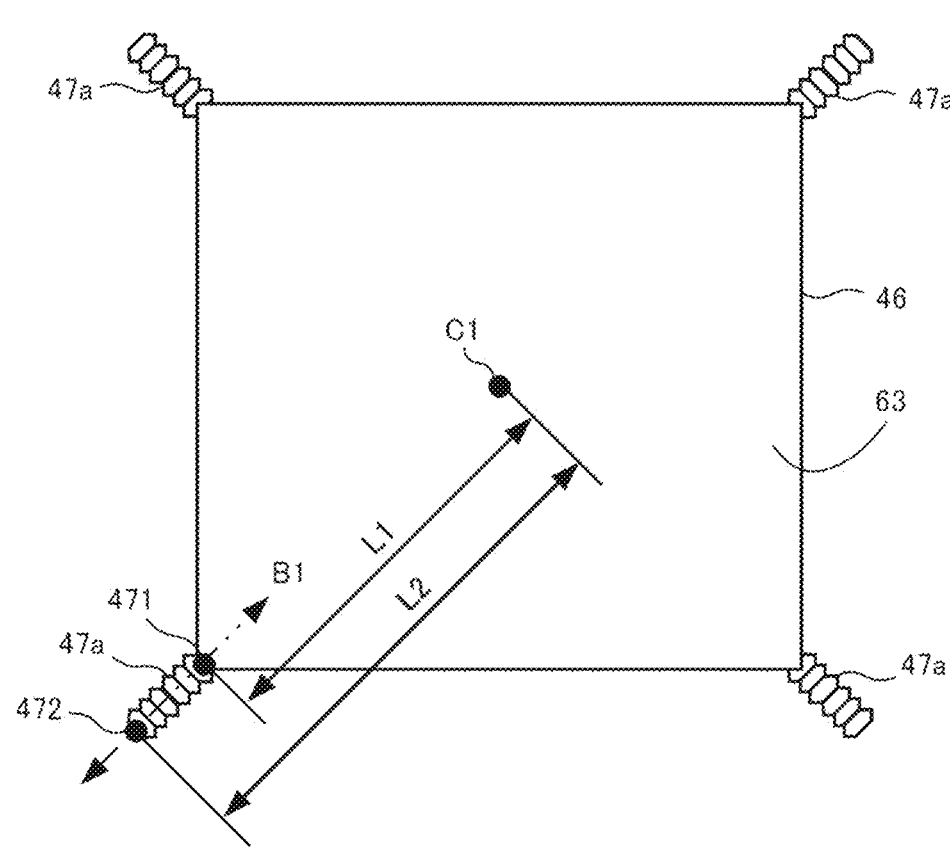
FIGS. 12A and 12B show another example of a method of providing first vibration-proof members.
Figure 12B:
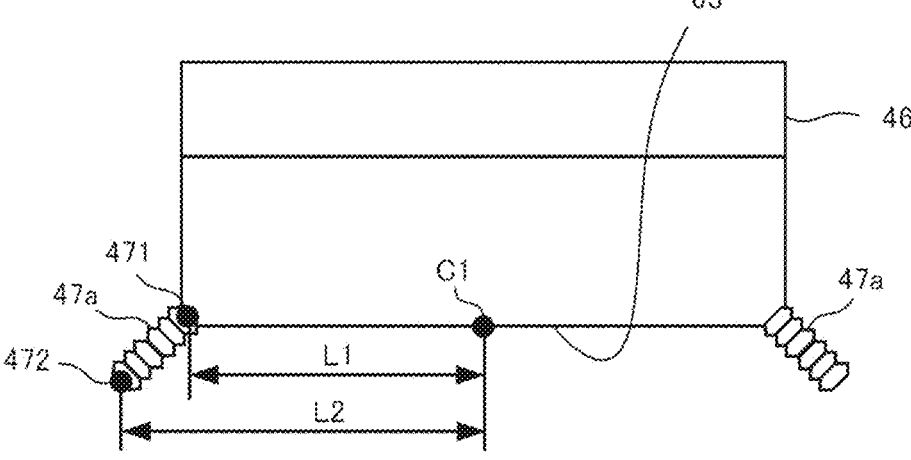

FIGS. 12A and 12B show another example of a method of providing the first vibration-proof members. FIG. 12A shows the housing 46 viewed from above, and FIG. 12B shows the housing 46 viewed from the left. In the example of FIGS. 12A and 12B, first vibration-proof members 47a are fixed to the housing 46. Each of the first vibration-proof members 47a has an extension/contraction direction B1 and is provided so that its upper end 471 in the extension/contraction direction B1 is closer to the center C1 of the bottom surface 63 of the housing 46 than its lower end 472 when viewed vertically from above.

The extension/contraction direction B1 is a direction in which each elastic first vibration-proof member 47a expands and contracts. When viewed vertically from above, a distance L1 from the upper end 471 of the first vibration-proof member 47a to the center C1 of the bottom surface 63 is shorter than a distance L2 from the lower end 472 of the first vibration-proof member 47a to the center C1 of the bottom surface 63. By providing each first vibration-proof member 47a in such a manner that it is tilted toward the center C1 of the bottom surface 63, the direction of the force received when the housing 46 vibrates back and forth, left and right becomes closer to the extension/contraction direction B1 of each first vibration-proof member 47a compared with the case where each first vibration-proof member 47a is provided without being tilted. As a result, the housing 46 can be stabilized compared with the case where each first vibration-proof member is provided without being tilted.

The configuration of the vehicle 10 is not limited to that described in FIG. 2. The vehicle 10 may comprise normal wheels instead of an infinite track. The vehicle 10 may be driven by transmitting a rotational force of the engine directly to the traveling portion 13 and the working portion 14, or it may generate a driving force by mounting only an electric motor without an engine. In the latter case, the vehicle 10 comprises a battery instead of the refueling portion 15. The vehicle 10 is not limited to mowing, but may also be a vehicle for spraying medicine, tilling, rice planting, harvesting, or the like. The vehicle 10 is not limited to remote control, but may also be a vehicle that is driven by a person or a vehicle with an autonomous travel function.

The function added by the function adding device 40 is not limited to that (autonomous travel function) described above. The function adding device 40 may, for example, add a function to autonomously control the operation of the working portion 14 as well as the traveling. In addition, the function adding device 40 may add a function to support remote control by displaying an image captured by the imaging portion 43 on the display panel 23 of the remote controller 20, so that the remote control can be performed even if the vehicle 10 is not visible. In short, the function adding device 40 may be one that adds a function that the vehicle 10 does not include.

The LiDAR 42 detects the markers 70 shown in FIG. 11 or the string-like object described above in the embodiment, but it is not limited thereto. The LiDAR 42 may detect obstacles such as people, trees and other vehicles, or it may detect work targets such as grass. In the embodiment, the LiDAR 42 is a 2D LiDAR whose optical axis directions are on the same plane, but it may also be a 3D LiDAR (three-dimensional LiDAR) with a wider scanning range.

The LiDAR 42 is not limited to a sensor that scans all 360 degrees, but it may also be a sensor that does not scan in some directions (e.g., backward).

The imaging portion 43 detects obstacles by cooperating with the function adding circuit 41 in the embodiment, but it is not limited thereto. The imaging portion 43 may detect, for example, a marker 70 or a string-like object as described above. The imaging portion 43 may also detect working targets such as grass. The imaging portion 43 may also detect the type of person (e.g., workers and other persons) by cooperating with the function adding circuit 41. For example, the imaging portion 43 and the function adding circuit 41 perform pattern recognition of a predetermined work uniform and detect a person wearing the work uniform as a worker.

The imaging portion 43 and the function adding circuit 41 may detect the state of the ground (wet condition, dry condition, etc.) based on luminance, hue, or the like indicated by each pixel of the image of the ground. In the case where the imaging portion 43 has a depth camera or a stereo camera, the imaging portion 43 can detect the distance and direction to the object. The function adding circuit 41 controls the operation of the vehicle 10, such as traveling and working, based on the various detection results of the LiDAR 42 and the imaging portion 43 described above.

The housing 46 is not limited to those shown in FIG. 3 and the like. For example, the housing 46 is a rectangular box-shaped member, but it may have a shape such as a triangular prism, a pentagonal prism, a hexagonal prism, or a column. The LiDAR 42 and the imaging portion 43 may be provided at different positions in the housing 46. In short, the housing 46 may be of any shape or material as long as the housing 46 can store the function adding circuit 41, the bypass unit 44 and the like inside, and it can be mounted so that the LiDAR 42, the imaging portion 43 and the like can measure a required object.

Appendix

In addition, the present invention may be provided with each of the following aspects.

(1) A function adding device, comprising: a housing that is mounted on a vehicle; a circuit stored in the housing to add a function to the vehicle; and a first vibration-proof member provided between the housing and the vehicle to damp vibrations transmitted from the vehicle to the housing.

According to such an aspect, it is possible to suppress a fault of the circuit to be retrofitted to the vehicle.

(2) The function adding device according to (1), comprising a sensor provided in the housing, wherein the circuit realizes the function by using a measurement result by the sensor.

According to such an aspect, it is possible to suppress degradation in measurement accuracy due to the vibration of the sensor.

(3) The function adding device according to (1) or (2), wherein: the housing has a bottom surface facing vertically downward in a state of being mounted on the vehicle, the bottom surface is in a shape of a polygon, and the first vibration-proof member is mounted within a predetermined length from a vertex of the polygon.

According to such an aspect, it is possible to stabilize the housing.

(4) The function adding device according to (3), wherein: the first vibration-proof member has an extension/contraction direction and is provided so that the upper end of the first vibration-proof member in the extension/contraction direction is closer to the center of the bottom surface of the housing than the lower end of the first vibration-proof member in the extension/contraction direction when viewed vertically from above.

According to such an aspect, it is possible to stabilize the housing.

(5) The function adding device according to any one of (1) to (4), wherein: the circuit is stored in the housing, and the function adding device comprises a second vibration-proof member that is provided between the circuit and the housing to damp vibrations transmitted from the housing to the circuit.

According to such an aspect, a breakage of the circuit can be further suppressed.

(6) The function adding device according to any one of (1) to (5), wherein: the vehicle includes a plurality of types of vehicles, the first vibration-proof member is fixed to a mounting member that is mounted to each of the plurality of types of vehicles, and a shape of a portion of the mounting member that is mounted to the vehicle is a shape corresponding to the vehicle, while a shape of a portion of the mounting member to which the first vibration-proof member is fixed is common regardless of the types of vehicles.

According to such an aspect, manufacturing cost can be reduced by using a common housing.

(7) The function adding device according to any one of (1) to (6), comprising a first sensor provided in the housing, wherein the first sensor has a function of detecting a position of a predetermined marker, the marker is arranged in a vicinity of a boundary of an area in which the vehicle travels, and the circuit controls the vehicle so that the vehicle travels inside an area whose boundary is in a vicinity of a position of the marker detected by the first sensor.

According to such an aspect, the vehicle can travel within a predetermined area even without a position sensor.

(8) The function adding device according to any one of (1) to (7), comprising a second sensor provided in the housing, wherein the second sensor has a function of detecting an obstacle, and when the second sensor detects the obstacle, the circuit controls the vehicle to avoid a collision with the obstacle.

According to such an aspect, it is possible to avoid a collision with an obstacle.

Of course, the present invention is not limited thereto.

Moreover, the above-described embodiment and variations may be implemented in any combination.

Finally, although various embodiments of the present invention have been described, these are presented as examples and are not intended to limit the scope of the present invention. Other novel embodiments may be implemented in various forms, and various omissions, substitutions, and modification may be made within the scope of invention without departing from the spirit of the present invention. The embodiments or modifications thereof are included in the scope and spirit of the present invention, as well as within the scope of the invention and equivalents thereof recited in the claims.

What is claimed is:

1. A function adding device, comprising:
an external housing mounted on an outer structure of a vehicle;
a circuit stored in the external housing, the circuit being configured to add a function to the vehicle;

a first vibration-proof member provided between the external housing and the outer structure of the vehicle to damp vibrations transmitted from the vehicle to the external housing; and
a first sensor provided in the external housing, the first sensor being configured to detect a position of a predetermined marker arranged in a vicinity of a boundary of a work area in which the vehicle travels to provide a measurement result, the work area being a closed area surrounded by the boundary,
wherein the circuit is further configured to control the travel of the vehicle such that the vehicle is configured to travel within the work area based on the measurement result corresponding to the position of the predetermined marker.

2. The function adding device according to claim 1, wherein
the circuit is further configured to realize the function by using the measurement result.

3. The function adding device according to claim 1, wherein
the external housing has a bottom surface facing vertically downward toward the outer structure of the vehicle in a state of being mounted on the vehicle,
the bottom surface is in a shape of a polygon, and
the first vibration-proof member is mounted within a predetermined distance from a vertex of the polygon.

4. The function adding device according to claim 3, wherein
the first vibration-proof member has an extension/contraction direction and is provided so that an upper end of the first vibration-proof member in the extension/contraction direction is closer to a center of the bottom surface of the external housing than an lower end of the first vibration-proof member in the extension/contraction direction when viewed vertically from above.

5. The function adding device according to claim 1, further comprising:
a second vibration-proof member that is provided between the circuit and the external housing to damp vibrations transmitted from the external housing to the circuit.

6. The function adding device according to claim 1, wherein
the vehicle includes a plurality of types of vehicles,
the first vibration-proof member is fixed to a mounting member that is mounted to the outer structure of each of the plurality of types of vehicles, and
a first configuration of a first portion of the mounting member that is mounted to the outer structure of each of the plurality of types of vehicles is unique to each of the plurality of types of vehicles, and
a second configuration of a second portion of the mounting member to which the first vibration-proof member is fixed is common regardless of the plurality of types of vehicles.

7. The function adding device according to claim 1, further comprising:
a second sensor provided in the external housing, wherein
the second sensor is configured to detect an obstacle in the work area, and
the circuit is further configured to control the vehicle to avoid a collision with the obstacle upon detecting the obstacle by the second sensor.

* * * * *